Feb. 14, 1967    L. F. HANES    3,303,941
FEEDING APPARATUS
Filed Aug. 12, 1965    4 Sheets-Sheet 3

INVENTOR
L. F. HANES
BY
Young + Quigg
ATTORNEYS

United States Patent Office 3,303,941
Patented Feb. 14, 1967

3,303,941
FEEDING APPARATUS
Lewis F. Hanes, Bartlesville, Okla., assignor to Phillips Petroleum Company, a corporation of Delaware
Filed Aug. 12, 1965, Ser. No. 479,191
9 Claims. (Cl. 214—1)

This invention relates to article feeding apparatus. In one aspect, this invention relates to apparatus which automatically inserts an article into a plastic container or bag.

Heretofore, article treating apparatus has been employed utilizing numerous types of mechanisms including clamping means for holding the article which utilized at least two moving parts for gripping and releasing the article. Also, various release mechanisms have been employed to remove the article from the clamping means. Generally, these mechanisms have operated in a manner slower than the capabilities of the conventional packaging machine which they were used to feed.

It has now been found that a quite high-speed feeding mechanism is effected if one part of the clamping means is fixed to a movable support while the other part of the clamping means is rotatably carried by a frame which is itself tiltably, rotatably or otherwise movably fixed to the same support which carries the first-mentioned part of the clamping means.

By the use of this apparatus an article is clamped by rotation of the rotatable part of the clamping means and inserted into a pacakging machine or the like by movement of the movable support. The article is removed from the clamping means by spreading and tilting of the rotatable frame which, in effect, moves the rotatable part of the clamping means away from the opposing fixed part of the clamping means. Spreading and tilting of the frame can be effected while the movable support is still in motion. Thus, the feeding cycle is significantly speeded up since there is no delay time between insertion and retraction of the clamping means from the packaging machine except for reversal of the direction of movement of the support means.

Accordingly, it is an object of this invention to provide a new and improved appartus for feeding articles. It is another object of this invention to provide a new and improved apparatus for automatically feeding articles into plastic containers, bags and the like.

Accordingly, it is an object of this invention to provide a new and improved apparatus for feeding articles. It is another object of this invention to provide a new and improved apparatus for automatically feeding articles into plastic containers, bags and the like.

Other aspects, objects and the several advantages of the invention will be apparent to those skilled in the art from the description, the drawing and the appended claims.

Figure 1:
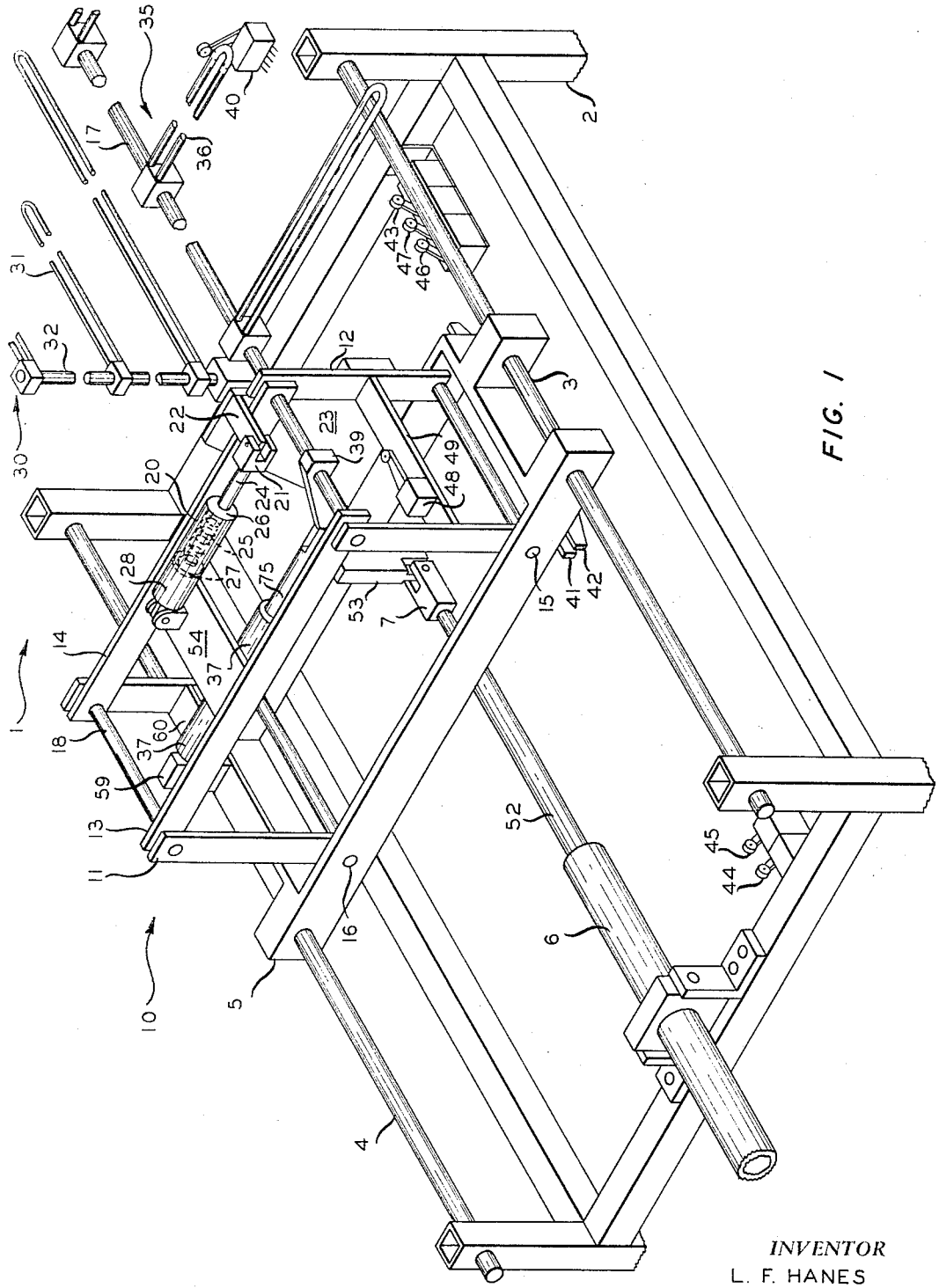
FIGURE 1 is a diametric view of apparatus employing this invention.

In FIGURE 1 there is shown feeding apparatus 1 supported on frame 2 to support bars 3 and 4 which are carried on opposite parallel sides of frame 2 and extend the full length thereof. A support means 5 is slidably supported on support bars 3 and 4. Support means 5 is moved back and forth along support bars 3 and 4 by pneumatic cylinder 6 acting through clevis 7.

A secondary frame means 10 comprising a pair of upstanding legs 11 and 12 and cross bars 13 and 14 between a leg in each pair 11 and 12 are rotatably carried on support 5 by bars 15 and 16. The upstanding legs and cross bars are rotatably connected by bars 17 and 18. Cross bars 13 and 14 have fixed thereto pneumatic cylinder 20 which is attached to 5 through clevis 21, horizontal bar 22, and vertical plate 23. Piston rod 24 of cylinder 20 has mounted thereon to the interior of cylinder 20, a resilient means 25 such as a coil spring which is biased so as to continuously force end 26 of cylinder 20 away from piston 27. Thus, if no air pressure greater than the strength of spring 25 is present in area 28 of cylinder 20, spring 25 will force cylinder 20 along piston rod 24 towards clevis 21. Since clevis 21 is fixed to support 5 and cylinder 20 is fixed to cross bars 13 and 14, such a movement of cylinder 20 pulls secondary frame 10 with it, thereby rotating same about bars 15, 16, 17, and 18 from the upstanding position shown to a tilted position (not shown but, for example, 10 to 15 degrees from vertical). In order to maintain secondary frame 10 in an upright position, it is necessary to maintain a continual pressure in area 28 of cylinder 20 which is sufficient in magnitude to force cylinder 20 away from clevis 21 against the bias of spring 25.

A first part of the clamping means employed is shown generally as 30 and comprises a plurality of fingers 31 fixed to an upright bar 32 which in turn is fixed to support 5. The clamping surface of 30 is thus oriented so that an edge or one end thereof is adjacent to secondary frame 10 and parallel to the direction of movement of support 5. The second part of the clamping means generally designated as 35 comprises a plurality of fingers 36 fixed to rotatable bar 17. Bar 17 is independently rotatable by cylinder 37 through clevis 38 (FIGURE 2) and gripping member 39. Thus, by actuation of cylinder 37, clamping means 35 can be rotated and transversed from the substantially horizontal position shown to a substantially vertical position (not shown), thereby disposing the clamping surfaces of 30 and 35 in a substantially adjacent relationship.

A switching means or other sensing device such as a photoelectric cell or electrical switch 40 is disposed relative to 35 so as to sense the presence of an article on the clamping surface of 35 and actuate cylinder 37 to rotate 35 into a substantially vertical position through bar 17, thereby clamping the article between 30 and 35. Support 5 is then moved along support bars 3 and 4 by cylinder 6 in a manner to be described later. Support 5 carries two cams 41 and 42 which are adjusted to trip and retrip switches 43 through 47 in a manner to be described later. A switch 48 is carried by bar 49 between upright legs 12 and adjusted so that clevis 38 contacts and trips same when 35 reaches a substantially upright position. Switch 48 is desirably a momentary contact switch since resetting of same by clevis 38 is not readily attained.

It should be noted that one cam as well as three or more cams can be employed if desired to trip various switches or combinations of switches at different times during the travel of support 5. At present, it is preferred to employ two cams at least one of which is adjustable so that the point at which it trips one or more switches can be varied. Adjustability is particularly desirable for that cam which is used to trip the switch to cause separation of 30 and 35 and, therefore, adjust the point of removal of the article from therebetween.

Figure 2:
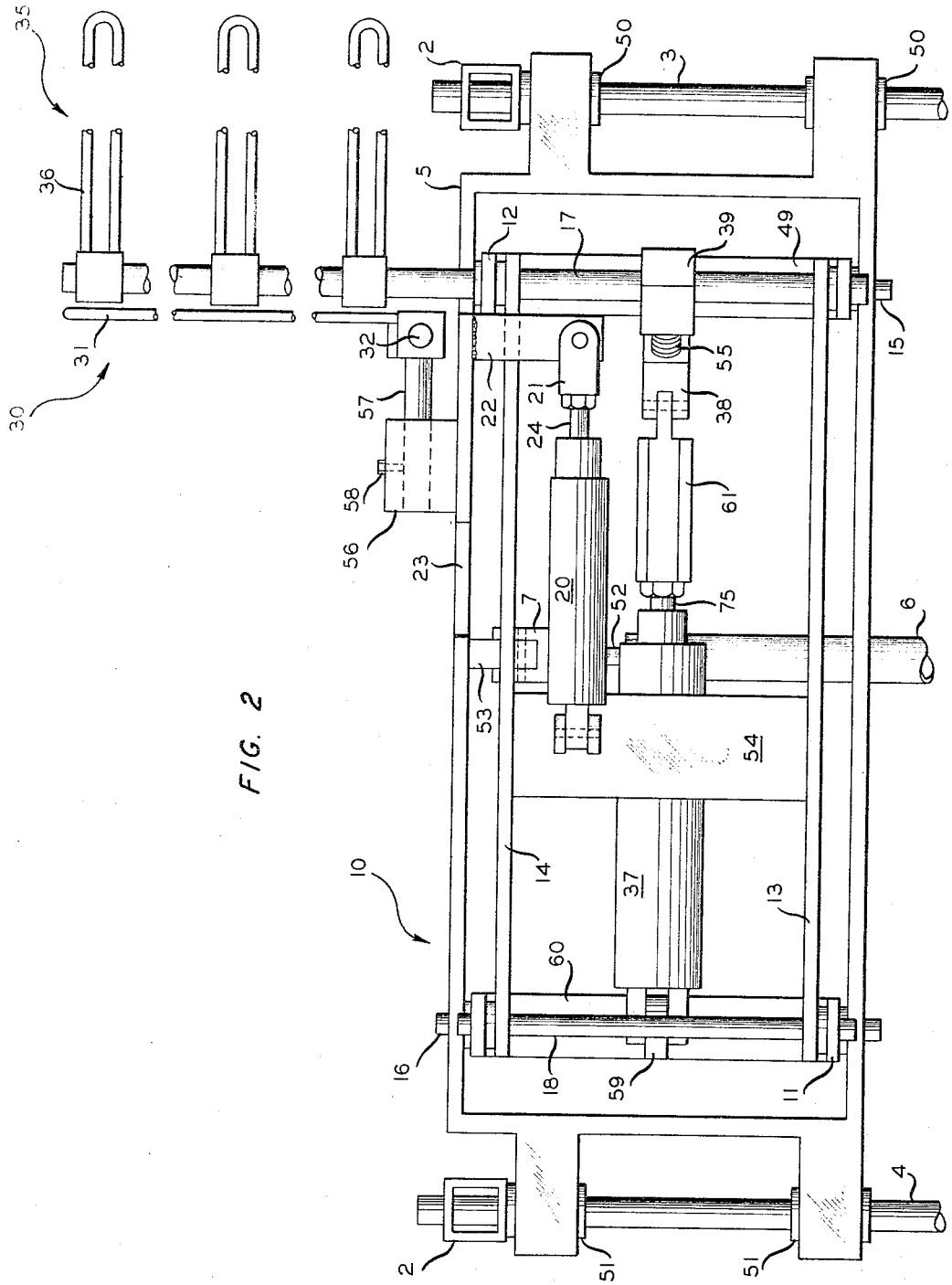
FIGURES 2 is a plan view of the apparatus of FIGURE 1.

FIGURE 2 shows support 5 carried on bars 3 and 4 through bushings 50 and 51. Piston rod 52 of cylinder 6 is connected through clevis 7 to member 53 of support 5. Plate 54 extending between and fixed to cross bars 13 and 14 fixedly supports cylinder 20. Cylinder 37 is connected to clevis 38 by member 61 and clevis 38 is connected to gripping member 39 by threaded member 55. Upright bar 32 is fixed to support 5 through upper (shown) and lower (not shown) apertured members 56. Bar 57 is fixed to upright bar 32 and slidably fits into the aperture of members 56. Locking means 58 comprising a set screw or other similar device is carried by members 56 to be used to fix bars 57 at any desired point along the length thereof thereby making the spaced between the clamping surfaces of 30 and 35, when in an upright position, variable. Cylinder 37 is fixed to plate 60 through member 59. Plate 60 is fixed between the upright pair of legs 11.

Figure 3:
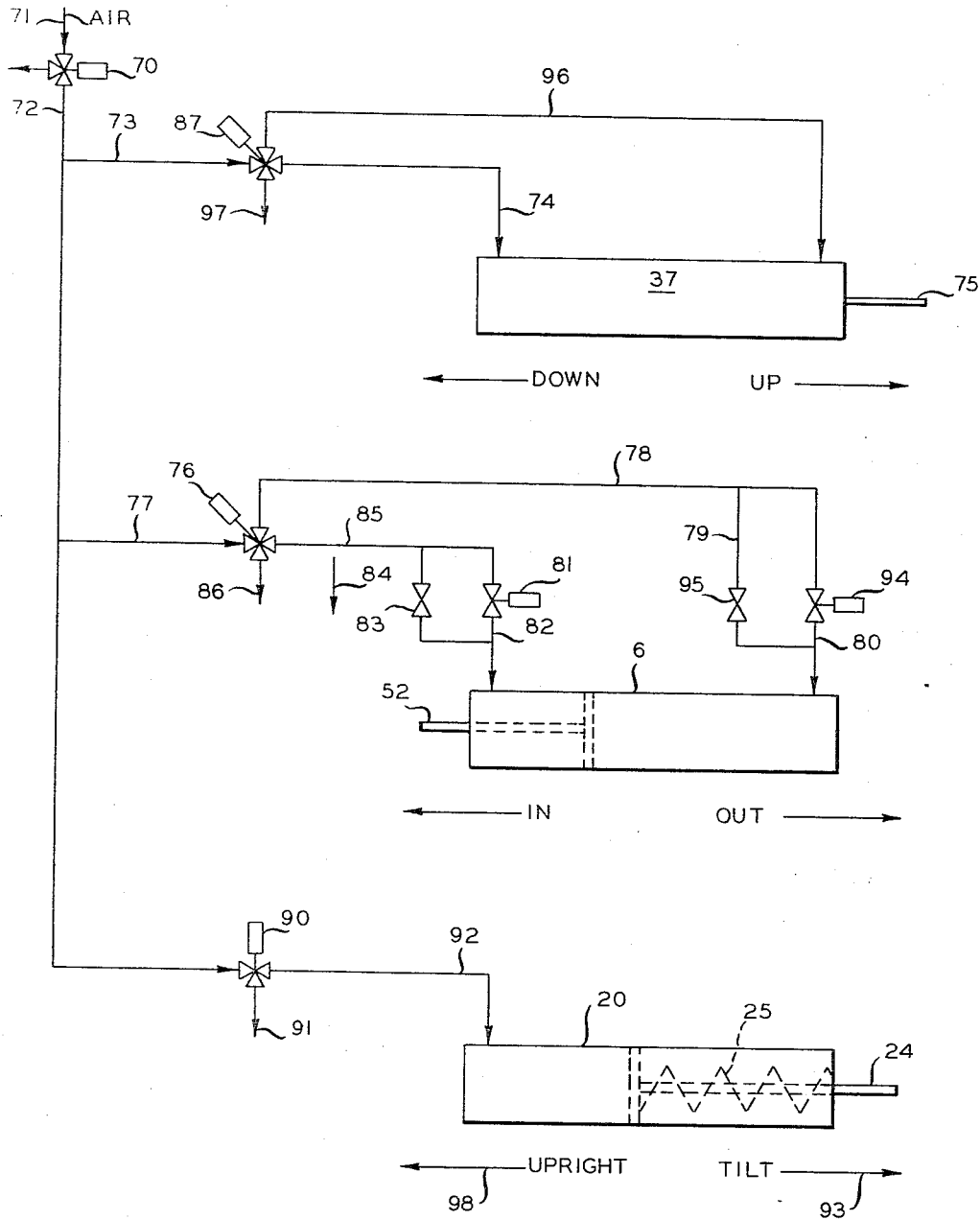
FIGURE 3 is a diagrammatic representation of a pneumatic system that can be employed to operate the apparatus of FIGURE 1.

In FIGURE 3 solenoid valve 70 is set to exhaust the pneumatic system when the machine is turned off and is also set to pass air from an air source through 71 into the pneumatic system through 72 when the machine is turned on. When an article trips switch 40 solenoid valve 87 is actuated to admit air from 72 through 73 and 74 to cause piston rod 75 to move outwardly from cylinder 37, thereby rotating bar 17 and raising 35 into a substantially upright position. This clamps the article that tripped switch 40 between 30 and 35. When 35 has reached a substantially upright position, clevis 38 is in a position to trip switch 48 which when down actuates solenoid valve 76 and allows air to pass from 72 through 77, 78, 79, and 80 into cylinder 6. This forces piston rod 52 out of cylinder 6 and thereby slides support 5 in the direction in which clamping means 30 and 35 extend. Thus, the article clamped between 30 and 35 is moved away from the end of frame 2 and into the container in which the clamped article is to be disposed.

During this outward movement of support 5, cam 41 trips switch 46 which actuates solenoid valve 81 to close line 82, thereby requiring the air being pushed out of cylinder 6 to pass through restrictor 83 which allows free flow of air in the direction of arrow 84 but restricts the flow of air in the opposite direction. By use of restrictor 83 and a consequent pressure build-up cylinder 6, an air cushion is provided which also tends to slow down the movement of piston rod 52. The air passing through either the conventional restrictor 83 or line 82 is exhausted by passing through 85 and 86.

While the movement of piston rod 52 and therefore support means 5 is decreasing, cam 42 trips switch 47 which in turn actuates solenoid valve 90 to shut off the air from 72 and to pass the air from cylinder 20 through 91 to exhaust. By this action spring 25 is allowed to move cylinder 20 in the direction of arrow 93 since piston rod 24 is fixed to support 5. Thus movement of cylinder 20 tilts secondary frame 10 from its normal upright position thereby moving 35 away from 30 and thereby unclamping the article and allowing it to fall therefrom into its receiver or container.

Cam 41 then trips switch 43 which closes a circuit that signals the packaging machine that an article has been inserted into a container therein and sets solenoid valve 76 so that air pressure from 77 passes through 85, 82 (solenoid valve 81 now being open) and 83 into cylinder 6. This forces piston rod 52 in the opposite direction thereby withdrawing clamping means 30 and 35 from inside the container into which the article has just been disposed. Air is then pushed from cylinder 6 through 79 and 80, 78 and 86 to exhaust. Switch 43 also resets solenoid valve 90 so that air pressure from 72 again passes through 92 into cylinder 20 thereby causing same to move in the direction of arrow 93. This movement forces secondary frame 10 back into a substantially upright position and therefore moves 35 back towards 30.

Upon being retracted, cam 42 of support 5 trips switch 45 which actuates solenoid valve 94 to close 80 thereby forcing all of the air from cylinder 6 through restrictor 95 which is similar in operation to restrictor 83 above described. Thus, in the retraction cycle a cushion of air is also provided which also decreases the speed of retraction of piston rod 52 and therefore support 5. Cam 42 then trips switch 44 which actuates solenoid valve 87 causing air pressure to pass from 73 through 96 into cylinder 37, forcing piston rod 75 thereinto, and rotating 35 from a substantially upright to a substantially horizontal position. Air is exhausted during this movement through 74 and 97.

It can thus be seen that by operation of this apparatus, an article is automatically clamped, moved into a container, the speed of the clamping means decreased and the article released while the clamping means is still moving. The direction of movement of the clamping means is then immediately reversed and the clamping means withdrawn and opened to pick up another article. It can be seen that this feeding operation can be made to operate rapidly since the article does not have to be removed from the clamping means after the clamping means has been inserted into the container and after the forward motion of the clamping means has been stopped.

Figure 4:
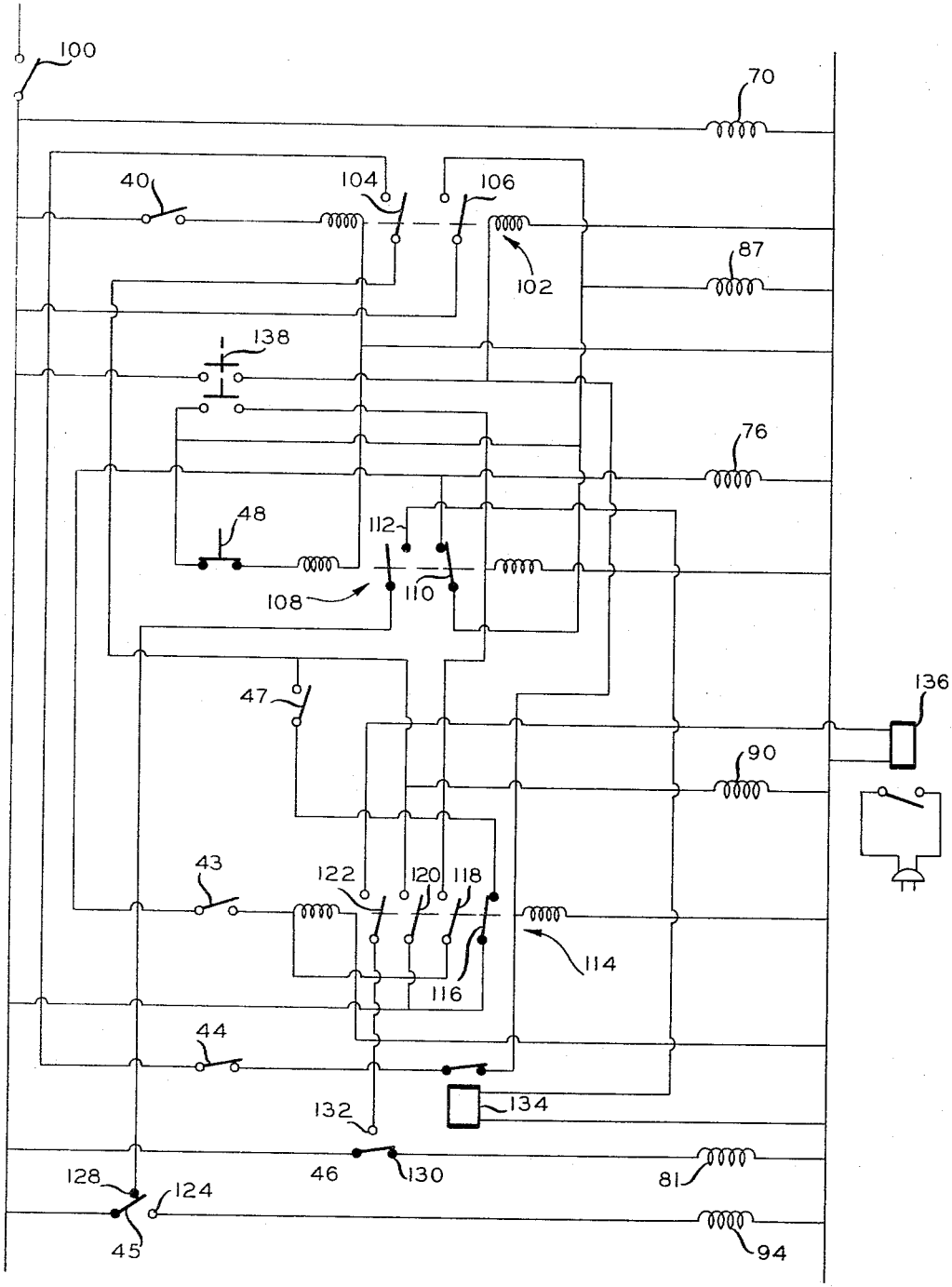
FIGURE 4 is a diagrammatic representation of an electrical system that can be used in the automatic operation of the apparatus of FIGURE 1.

In FIGURE 4 the electricity is supplied to the machine through switch 100. When switch 100 is turned on it actuates solenoid valve 70 thus supplying air to the machine. When switch 40 is tripped by the article to be packaged it energizes latching relay 102, making contacts 104 and 106. The making of contact 106 energizes solenoid valve 87 thereby opening same. Air cylinder 37 (FIGURE 3), operated by air supplied through solenoid valve 87, clamps the article to be packaged between 30 and 35 and actuates switch 48 which energizes latching ralay 108, making contact 110 and breaking contact 112. Contact 110 energizes soleoind valve 76 (FIGURE 3), opening it and supplying air to cylinder 6 thus starting support 5 (FIGURE 2) in motion towards the article receiver or container. As support 5 (FIGURE 2) moves, cam 42 rides off switch 44 and cam 41 rides off switch 45, thus opening switch 44, breaking contact 124 of switch 45, and making contact 128 of switch 45. Also, as support 5 (FIGURE 2) moves, cam 41 trips switch 46, breaking contact 130 and making contact 132. On breaking contact 130, solenoid valve 81 is de-energized and closes, thus slowing the motion of support 5. Next, cam 42 on support 5 trips switch 47 and de-energizes solenoid valve 90, thus releasing the article to be packaged from its clamped relationship between 30 and 35. Cam 42 then trips switch 43 which energizes latching relay 114 and also feeds contact 118 of relay 114. Contact 116 is broken and contacts 118, 120 and 122 are all made. Contact 18, on making, energizes latching relay 108, thus breaking contact 110 and making contact 112. On breaking contact 110, solenoid 76 is de-energized, thus changing the direction of motion of support 5. On making contact 112 relay switch 134 is actuated thereby opening same. Contact 120 of relay 114 feeds switch 44 through contact 104 of relay 102. Also, contact 120 energizes solenoid 90 thus bringing members 30 and 35 to the clamped position. Contact 122, on making, actuates relay switch 136 thus signaling the packaging machine that an article has been deposited in the article receiver or container. As support 5 moves in the reverse direction, cam 42 rides off switches 43 and 47 and cam 41 rides off switch 46, thus opening switch 43 and breaking contact 132 of switch 46, while closing switch 47 and making contact 130 of switch 46. Contact 130 energizes solenoid valve 81, thereby opening it. Breaking contact 132 de-energizes relay switch 136. As support 5 nears its original start position, cam 41 trips switch 45, breaking contact 128 and making contact 124. Breaking contact 128 makes relay switch 134. Making contact 124 energizes solenoid valve 94, thus closing it and slowing down the movement of support 5. Cam 42 then closes switch 44, which actuates latching relays 114 and 102. Contact 116 is made, thus continuing the energization of solenoid valve 90 and contacts 118, 120 and 122 are broken. Also, contacts 104 and 106 are broken. Breaking contact 106 de-energizes solenoid valve 87, thus lowering 35 to a position adaptable to picking up another article. The cycle is now ready to start again when an article trips switch 40. Switch 138 is a reset switch operating latching relays 102, 108 and 114. This switch de-energizes solenoid valve 76 and returns the machine to the start position. When switch 100 is turned off solenoid valve 70 is de-energized thus shutting off the air supply to the machine and exhausting the air in the pneumatic system of the machine.

Reasonable variations and modifications are possible within the scope of this disclosure without departing from the spirit and scope thereof.

I claim:

1. In an article feeding apparatus, a movable first clamping means, a movable and tiltable frame adjacent said first clamping means and adapted to move away from said clamping means, a second clamping means rotatably carried adjacent said first clamping means by said movable frame in a manner such that moving of said frame moves said second clamping means away from said first clamping means, and means for moving said frame and said first clamping means together and for moving said frame and rotating said second clamping means sequentially.

2. Article feeding apparatus comprising a frame, a support means movably carried by said frame, an upstanding first clamping means carried by said supporting means, a secondary frame movably carried by said support means and adapted to move away from the clamping surface of said first clamping means, a second clamping means rotatably carried by said secondary frame in a manner such that moving of said secondary frame moves said second clamping means away from the clamping surface of said first clamping means, said second clamping means extending from said secondary frame and having its clamping surface adjusted to oppose the clamping surface of said first clamping means during at least one point in its arc of rotation, and means for moving said support means, moving said frame and rotating said second clamping means sequentially.

3. Article feeding apparatus comprising a frame, a support means movably carried by said frame, an upstanding first clamping means fixed to said support means, a secondary frame rotatably carried by said support means adjacent one end of the clamping surface of said first clamping means and adapted to rotate away from said clamping surface of said first clamping means, a substantially horizontal second clamping means rotatably carried by said secondary frame in a manner such that rotation of said secondary frame moves said second clamping means away from said first clamping means, said second clamping means extending from said secondary frame and having its clamping surface when rotated into an upstanding position adjacent the clamping surface of said first clamping means, and means for moving said support means and rotating said frame and said second clamping means sequentially.

4. Article feeding apparatus comprising a frame, a supporting means slidably carried on said frame, means for moving and support means, an upstanding first clamping means carried by said support means, an upstanding secondary frame tiltably carried by said support means adjacent an edge of the clamping surface of said first clamping means and adapted to tilt from its upstanding position away from said edge of said first clamping means, means for tilting said secondary frame, a substantially horizontal secondary clamping means rotatably carried by said secondary frame in a manner such that tilting of said secondary frame moves said second clamping means away from the clamping surface of said first clamping means, said second clamping means extending from said secondary frame and having its clamping surface when rotated into a substantially upstanding position adjacent the clamping surface of said first clamping means, and means for rotating said second clamping means.

5. Article feeding apparatus comprising a frame, a support bar fixed to and extending along at least one side of said frame, a support means slidably carried by said support bar, means for sliding said support means along said support bar, a secondary frame comprising two pairs of upstanding legs each pair rotatably carried on opposite sides of said support means, means for rotating said secondary frame from an upstanding position to a tilted position and back again, said means being resiliently biased for keeping said secondary frame in an upstanding position, a first clamping means rotatably carried on one end of said secondary frame, the clamping surface of said first clamping means extending from said second frame in a direction parallel to the direction of movement of said support means, means for rotating said first clamping means and the clamping surface thereof, a second clamping means fixed to said support means and disposed adjacent said first clamping means, the clamping surface of said second clamping means extending from said secondary frame in a direction parallel to the direction of movement of said support means in a manner such that the clamping surfaces of said first and second clamping means meet one another when said first clamping means is rotated towards said second clamping means, and means for moving said support means and means for rotating said secondary frame and said clamping means sequentially.

6. Article feeding apparatus comprising a frame having at least two parallel sides extending the length thereof, a support bar fixed to and extending along the length of said at least two parallel sides of said frame, a support means slidably carried by said support bars, a first pneumatic means for reciprocating said support means along substantially the full length of said support bars, a secondary frame comprising two pairs of upstanding legs each pair tiltably carried on a side of said support means which is adjacent said support bars and at least one cross bar rotatably joining a leg from each of said two pairs of legs, a second pneumatic means fixed to said cross bar and to said support means for tilting said secondary frame from an upstanding position to a tilted position and back again, said second pneumatic means being resiliently biased so as to constantly urge said secondary frame into said tilted position, means for normally maintaining said secondary frame in said upstanding position, a substantially horizontally disposed first finger clamp rotatably carried on one of said ends of said secondary frame which is adjacent a support bar, the clamping surface of said first clamp extending from said second frame in a direction parallel to the direction of movement of said support means, a third pneumatic means carried by one pair of said upstanding legs and adapted to rotate said first clamp and the clamping surface thereof from said substantially horizontal position to substantially vertical position and back again, a substantially vertical second finger clamp fixed to said support means adjacent said first clamp, the clamping surface of said second clamp extending from said secondary frame in a direction parallel to the direction of movement of said circuit means and above the clamping surface of said substantially horizontally disposed first clamp so that the clamping surfaces of said clamps are adjacent one another when said first clamp is rotated into a substantially vertical position, means for sequentially moving said first clamp from said substantially horizontal position to a substantially vertical position upon placement of an article thereon, sliding said support means along said support bars in the direction in which said clamps extend from said secondary frame, tilting said secondary frame to move said first clamp away from said second clamp to allow the clamped article to fall therefrom, moving said secondary frame back to a substantially vertical position to move said first clamp back towards said second clamp, sliding said support means back along said support bars, and rotating said first clamp to a substantially horizontal position for placement thereon of another article.

7. The apparatus according to claim 6 wherein said means for sequential moving is automatic.

8. The apparatus according to claim 7 wherein said second finger clamp is adjustably fixed to said support means so that the space between the clamping surface thereof and the clamping surface of said first clamp when in said substantially vertical position can be varied.

9. The apparatus according to claim 6 wherein said means for sequential moving includes a series of switches actuated by at least one cam means carried by said support means.

References Cited by the Examiner
UNITED STATES PATENTS

| | | | |
|---|---|---|---|
| 2,071,123 | 2/1937 | Hubelmeyer | 271—85 |
| 2,863,571 | 12/1958 | Foley et al. | 214—1 |

MARVIN A. CHAMPION, *Primary Examiner.*